A. Campbell,
Cage Trap.
No. 81,596.  Patented Sep. 1. 1868.
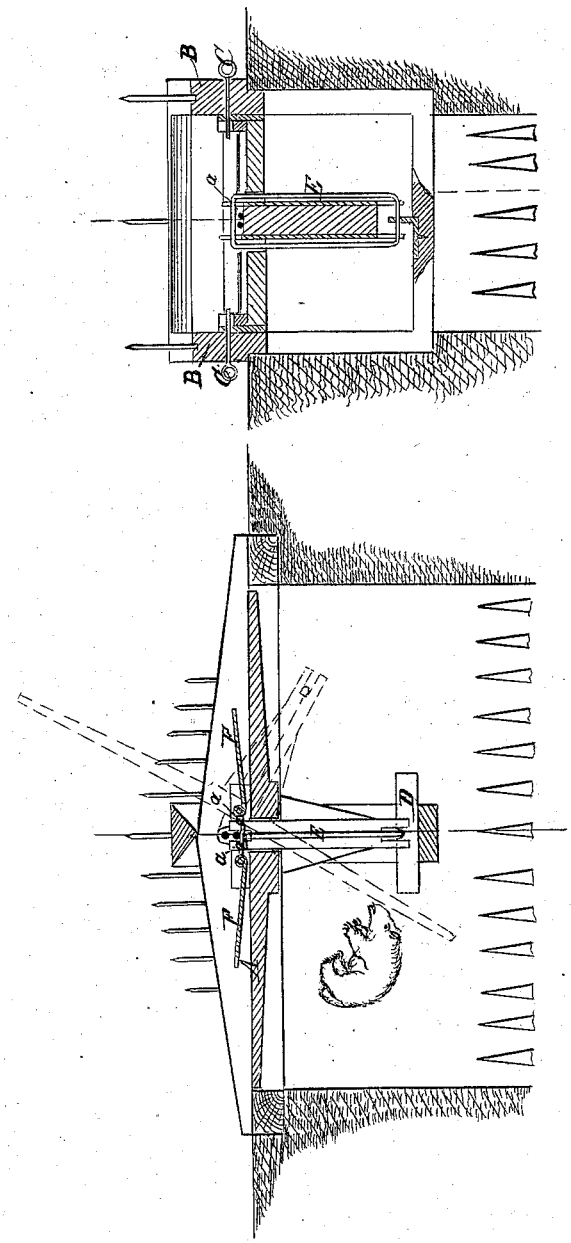
Witnesses:
Wm A Morgan
G. C. Cotton
Inventor:
A. Campbell
per Munn & Co
Attorneys

United States Patent Office.

ALEXANDER CAMPBELL, OF OXFORD, INDIANA.

Letters Patent No. 81,596, dated September 1, 1868.

IMPROVED ANIMAL-TRAP.

*The Schedule referred to in these Letters Patent and making part of the same.*

TO ALL WHOM IT MAY CONCERN:

Be it known that I, ALEXANDER CAMPBELL, of Oxford, in the county of Benton, and State of Indiana, have invented a new and useful Improvement in Animal-Traps; and I do hereby declare that the following is a a full, clear, and exact description thereof, which will enable others skilled in the art to make and use the same, reference being had to the accompanying drawings, forming part of this specification, in which—

Figure 1 represents a longitudinal section, and

Figure 2 represents a cross-section thereof.

Similar letters of reference indicate corresponding parts.

The object of this invention is to provide a simple and effective self-setting trap.

In consists in a platform suspended centrally in respect of its length over a pit, but above the centre vertically, so that it will return to its normal position by the action of gravitation, and provided with a latch projecting downward from the centre of the platform, to hold it in position until the animal approaching the bait, near the centre of the platform, steps on a hinged plate connected with the latch, disengaging it, whereby the weight of the animal causes the end of the platform he is on to swing downward, delivering him into the pit.

In the drawings, A represents a platform, suspended from the side rails B over a pit, (or it may be a box for small animals) by the pivots C C.

D represents a catch, supported by suitable framework suspended from the side rails, into which a latch, E, works, to hold the platform in a level position.

F and F represent plates pivoted on the platform, slightly above its face, and near the centre thereof, where the bait is to be placed, which are provided with tongues $a$ $a$, which take under the upper cross-bar of the latch E. They are so arranged with reference to weight, that the weight of the latch will hold them down at their inner edges, and raised slightly above the face of the platform, at their outer edges, in which position the trap will be set.

When an animal approaches the bait from either end of the platform, which he can only do, the sides being guarded by pointed rods or other suitable means, the latch and catch will resist his weight until he reaches the pivoted plates F, by which time he will be well on the said platform, so that he cannot retreat after the platform begins to go down, which will instantly occur as he treads upon either of the said oscillating plates, which, being pushed down at their outer edges, will raise the latch E out of the notch in the catch D.

When the platform has swung down so far as to be delivered of the animal, it will swing back to a level position by reason of its centre of gravitation being below its centre of oscillation, whereby the latch will be restored to its position in the catch.

Having thus described my invention, I claim as new, and desire to secure by Letters Patent—

The latch E and hinged plates F, having tongues $a$, adapted to swing with the centrally-pivoted platform A, and arranged with relation to the notched plate fixed to frame D as herein shown and described.

ALEX. CAMPBELL.

Witnesses:
THOS. S, MERRICK,
ISAAC H. PHARES.